United States Patent
Chang

(10) Patent No.: US 6,786,498 B1
(45) Date of Patent: Sep. 7, 2004

(54) SHOCK ABSORBING DEVICE FOR A BICYCLE

(75) Inventor: Owen Chang, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/423,934

(22) Filed: Apr. 28, 2003

(51) Int. Cl.⁷ .................................................. B62K 1/00
(52) U.S. Cl. ................... 280/275; 280/283; 188/319.1; 267/226
(58) Field of Search .................... 280/275, 283, 280/274, 276, 277, 284; 180/219; 188/317, 319.1, 319.2, 322.13; 267/226

(56) References Cited

U.S. PATENT DOCUMENTS

| | | | | |
|---|---|---|---|---|
| 4,588,053 A | * | 5/1986 | Foster | 188/275 |
| 4,971,344 A | * | 11/1990 | Turner | 280/276 |
| 5,186,481 A | * | 2/1993 | Turner | 280/276 |
| 5,277,283 A | * | 1/1994 | Yamaoka et al. | 188/282.2 |
| 5,284,352 A | * | 2/1994 | Chen | 280/276 |
| 5,310,203 A | * | 5/1994 | Chen | 280/276 |
| 5,456,480 A | * | 10/1995 | Turner et al. | 280/276 |
| 5,848,675 A | * | 12/1998 | Gonzalez | 188/319.2 |
| 6,286,642 B1 | * | 9/2001 | Yi | 188/319.2 |

* cited by examiner

*Primary Examiner*—Lesley D. Morris
*Assistant Examiner*—Tony Winner
(74) *Attorney, Agent, or Firm*—Harness, Dickey & Pierce, P.L.C.

(57) ABSTRACT

A shock absorbing device is provided to reduce shock that is transmitted to a handlebar of a bicycle, and includes a damping member disposed between a mount and a leg member and having a damping capacity. A driven member is rotatably mounted on the mount and is turned by a twist actuating member which is in synchronized operation with a brake actuating member of the bicycle. A regulating member is disposed to be actuated, in response to the angular movement of the driven member, to vary the damping capacity of the damping member, thereby enhancing the safety and comfort of the rider when the bicycle is braked.

9 Claims, 8 Drawing Sheets

SHOCK ABSORBING DEVICE FOR A BICYCLE

BACKGROUND OF THE INVENTION

1. Field of the Invention

This invention relates to a shock absorbing device for a bicycle, more particularly to a shock absorbing device which includes a damping member with a damping capacity that can be varied in response to a braking action of the bicycle.

2. Description of the Related Art

In order to lessen the shock as a result of unevenness of the road surface and transmitted to a handlebar of a bicycle, the conventional bicycle is generally provided with a shock absorbing device. The shock absorbing device includes a mount and a leg member which are respectively mounted to a support frame and a wheel axle and which are movable relative to each other in an upright direction, and a damping member which is disposed between the mount and the leg member to provide a damping action for the shock. However, when the handlebar is abruptly pressed by the combined inertial momenta of the mass of the rider and the mass of the bicycle as a result of a braking action, the mount will be moved abruptly downwardly and forwardly, thereby exposing the rider to danger.

SUMMARY OF THE INVENTION

The object of the present invention is to provide a shock absorbing device for a bicycle, which can decrease the damping capacity of a damping member thereof in response to a braking action so as to counteract the downward and forward movement of a handlebar, thereby enhancing safety and comfort.

According to this invention, the shock absorbing device includes a mount with a periphery. The mount is adapted to be mounted to the support frame, and has a confronting wall which faces downwards in an upright direction. A leg member includes a lower end which is adapted to be anchored to a wheel axle, and an intermediate segment which extends from the lower end in the upright direction and which terminates at an upper end that is spaced apart from the confronting wall and that is movable relative to the confronting wall in the upright direction. A driven member has an actuated portion which is disposed on the mount, and which is rotatable relative to the mount about a twisting axis in the upright direction, and a coupling portion which extends from the actuated portion in the upright direction and downwardly of the confronting wall. A twist actuating member is disposed in synchronized operation with the brake actuating member to twist the actuated portion of the driven member to rotate about the twisting axis so as to angularly move the coupling portion from a first position to a second position. A damping member is provided with a damping capacity, and is disposed between the upper end of the leg member and the confronting wall so as to diminish progressively the shock energy generated, by an abrupt movement of the upper end relative to the confronting wall, which is brought about by a sudden depression on the support frame by the combined inertial momenta of the mass of a rider and the mass of the bicycle when the brake actuating member is actuated, or by a shock transmitted upwards through the wheel axle as a result of unevenness of a road surface being traversed by the bicycle. A regulating member is configured to vary the damping capacity of the damping member in response to the angular movement of the coupling portion from the first position to the second position.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
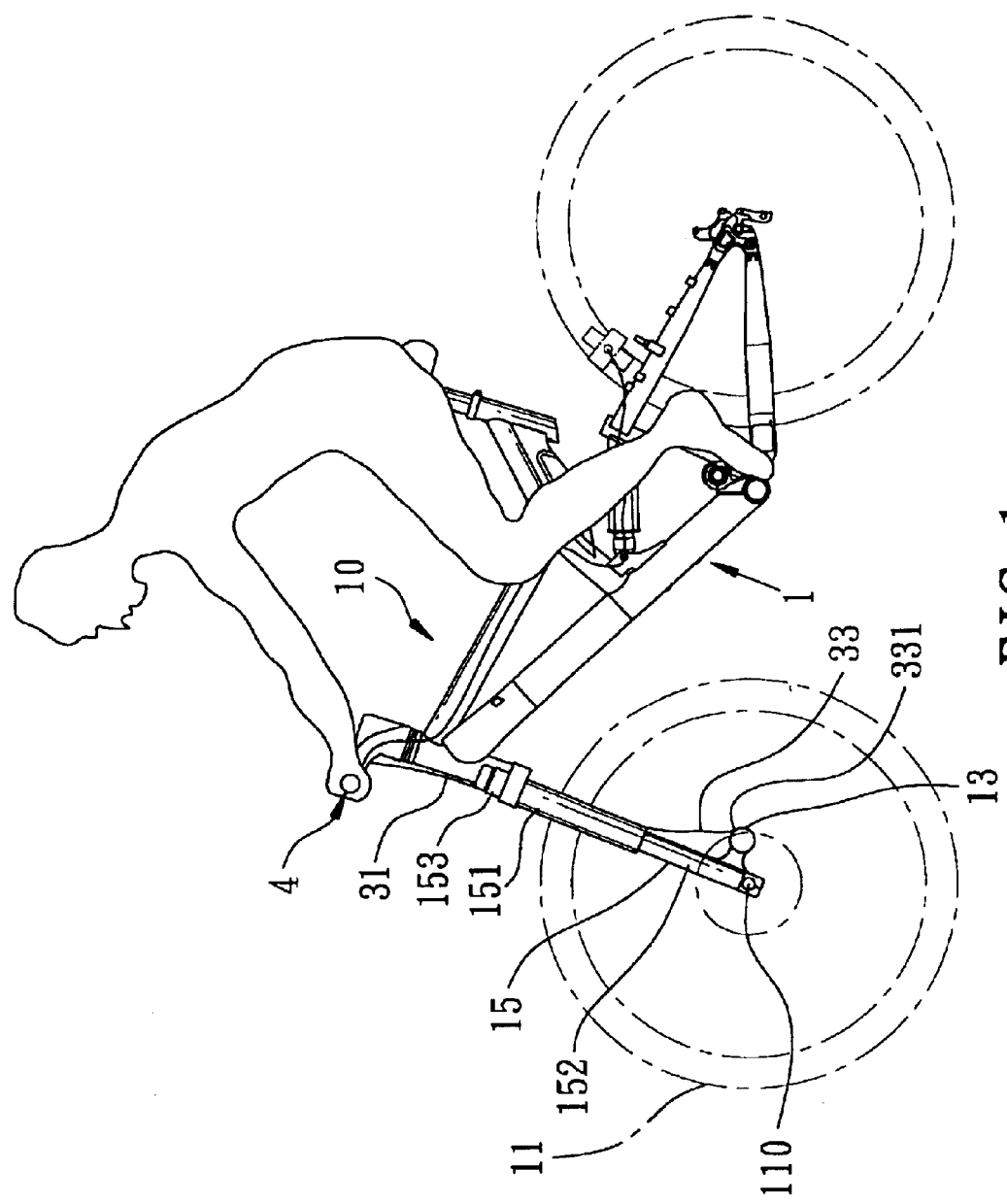
FIG. 1 is a schematic side view of a first preferred embodiment of a shock absorbing device according to this invention when incorporated in a bicycle.

Before the present invention is described in greater detail, it should be noted that same reference numerals have been used to denote like elements throughout the specification.

Figure 2:
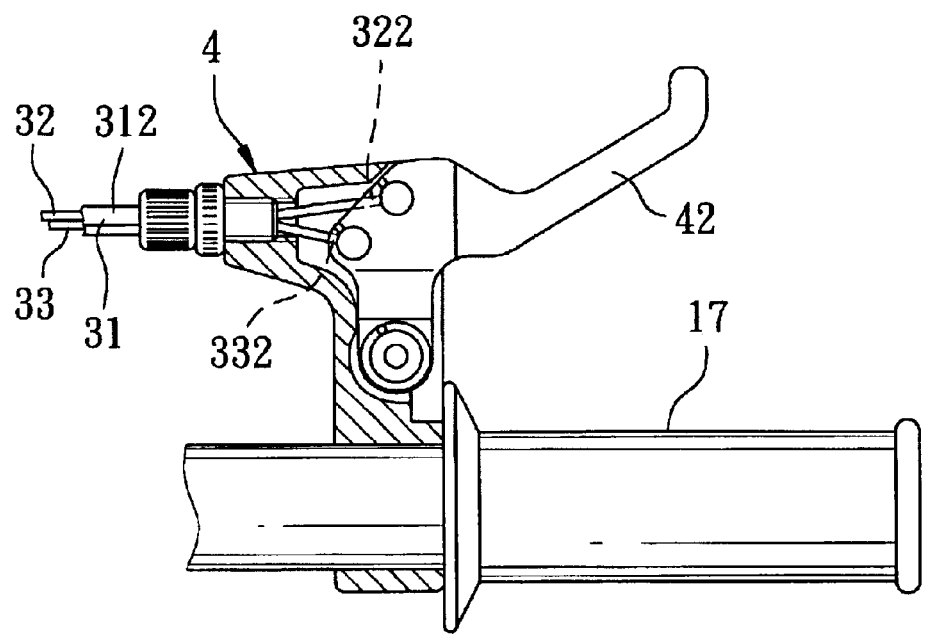
FIG. 2 is a fragmentary partly sectional view of a brake actuating member and a twist actuating member of the first preferred embodiment.
Figure 2:
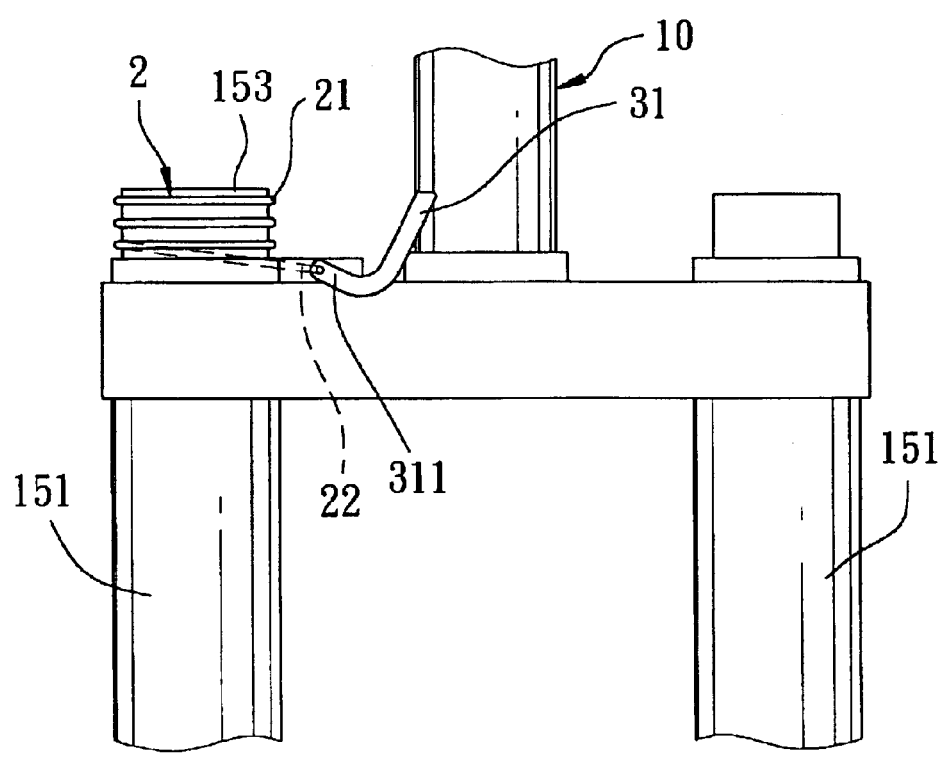

Referring to FIGS. 1 and 2, the first preferred embodiment of a shock absorbing device 15 according to the present invention is shown to be mounted between a support frame 10 and a front wheel axle 110 of a bicycle 1. The support frame 10 defines a swivel axis in an upright direction. A handlebar 17 is disposed to turn the support frame 10 about the swiveling axis. The front wheel axle 110 defines a rotating axis transverse to the upright direction, and is provided with a front wheel 11 for rotating about the rotating axis. A brake actuating member 4 includes a brake lever 42 which is mounted pivotally on the handlebar 17, and a brake cable 33 which has an end 332 secured to the brake lever 42, and an opposite end 331 secured to a brake member 13 in a known manner so as to be pulled by the brake lever 42 for slowing down and stopping the rotation of the front wheel 11.

Figure 3:
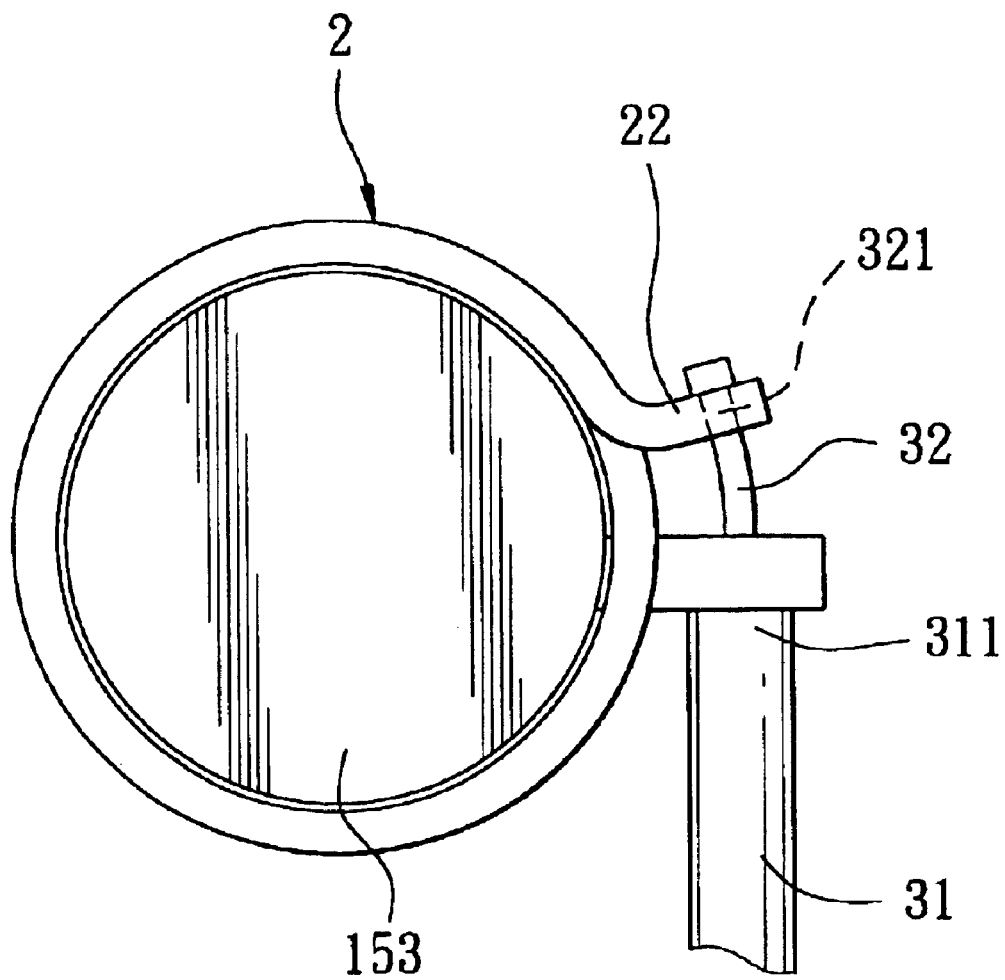
FIG. 3 is a schematic top view of the twist actuating member of the first preferred embodiment.
Figure 4:
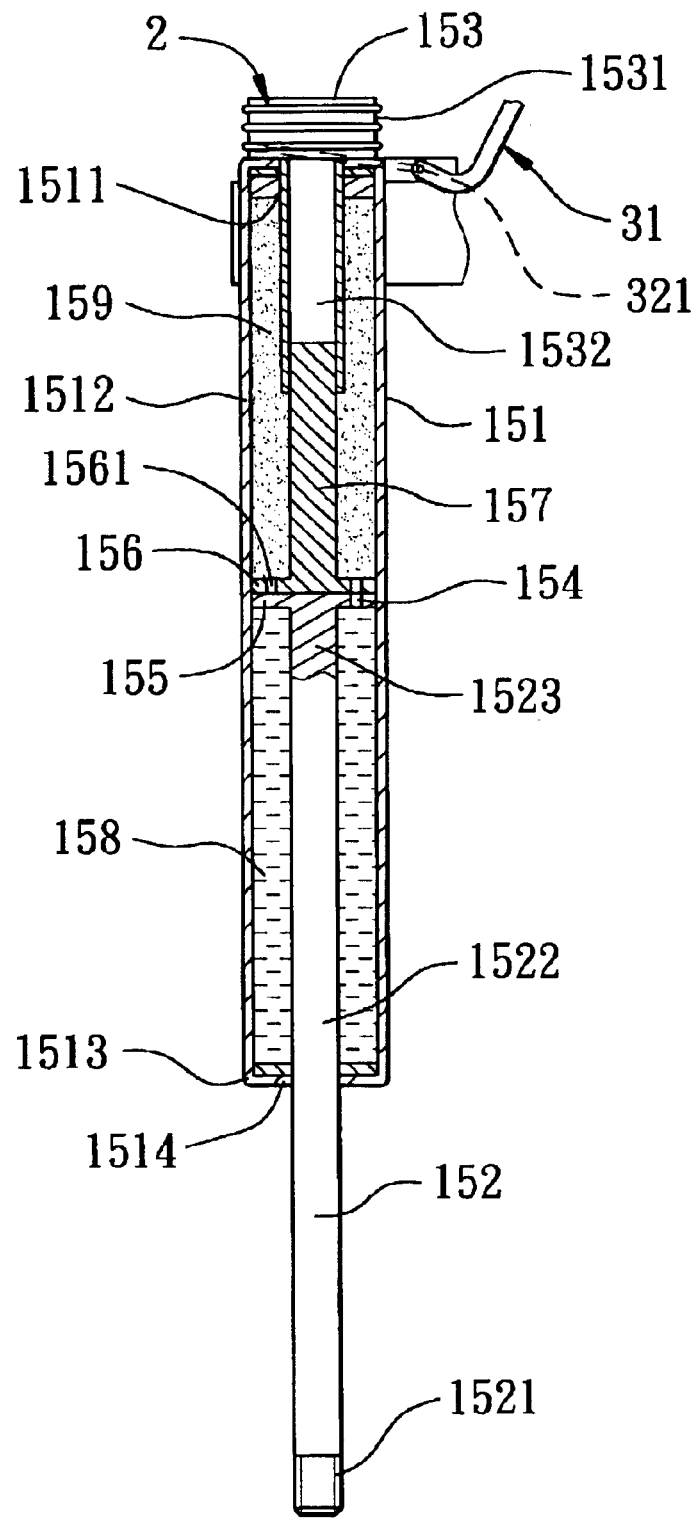
FIG. 4 is a fragmentary sectional view of the first preferred embodiment.
Figure 5:
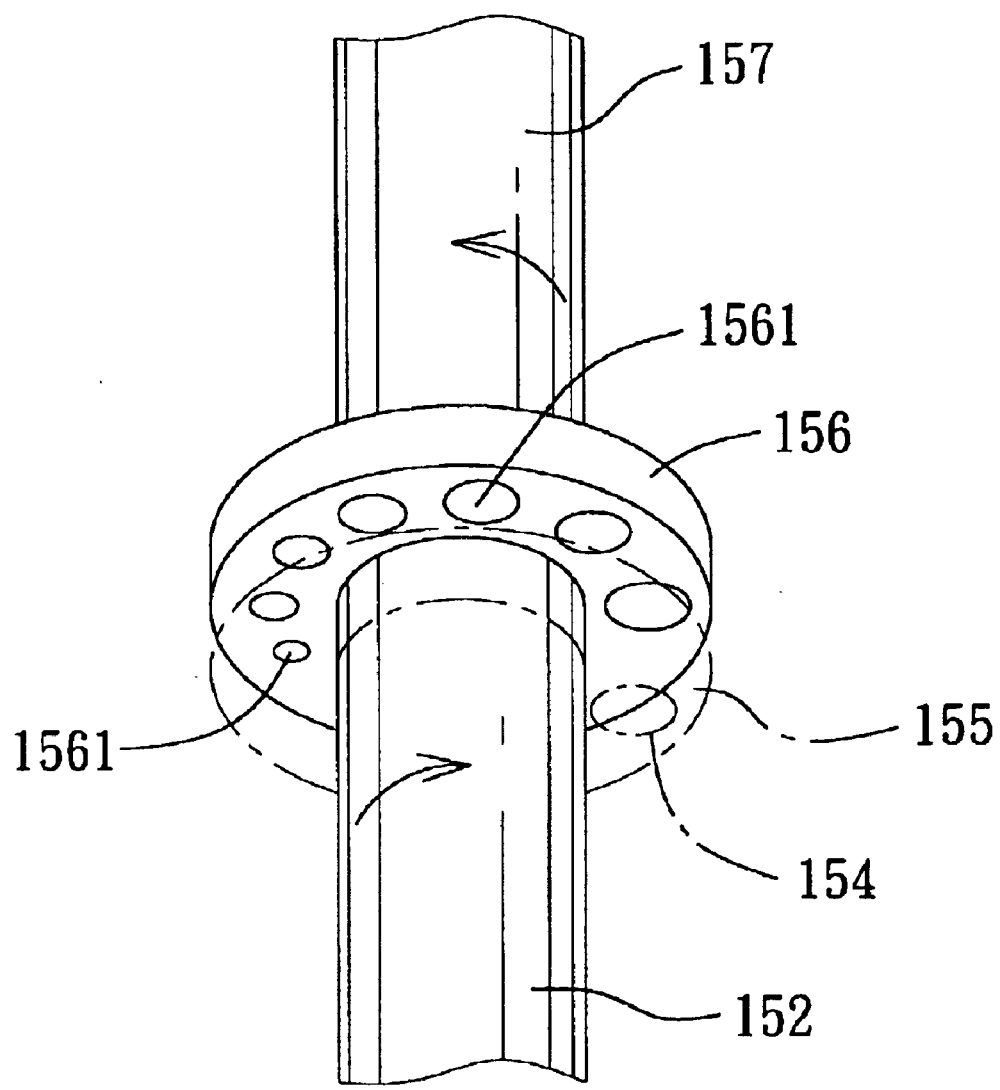
FIG. 5 is a fragmentary perspective view of a regulating member of the first preferred embodiment.

With reference to FIGS. 3 to 5, the shock absorbing device 15 includes a pair of tubular mounts 151, a pair of leg members 152 (only one is shown), a driven member 153, a twisting actuating member, a pair of damping members, and a regulating member.

Each of the mounts 151 is mounted to the support frame 10, and has a confronting wall 1511 which faces downwards in the upright direction. A surrounding wall 1512 extends downwardly from a periphery of the confronting wall 1511 in the upright direction and which terminates at a lower surrounding edge 1513. A bottom wall 1514 extends in radial directions from the lower surrounding edge 1513 so as to be spaced apart from the confronting wall 1511, and cooperates with the surrounding wall 1512 to confine a cylindrical chamber.

Each of the leg members 152 includes a lower end 1521 which is anchored to the front wheel axle 110, and an intermediate segment 1522 which extends from the lower end 1521 in the upright direction and which terminates at an upper end 1523 that is spaced apart from the confronting wall 1511 of a respective one of the mounts 151 and that is movable relative to the confronting wall 1511 in the upright direction. The intermediate segment 1522 extends through the bottom wall 1514 of the respective mount 151 into the cylindrical chamber. The upper end 1523 extends radially to form a partition wall 155 which is in sliding contact with the surrounding wall 1512 so as to divide the cylindrical chamber into upper and lower compartments that are respectively proximate to the confronting wall 1511 and the bottom wall 1514. The lower and upper compartments are respectively filled with a non-compressible fluid 158, such as oil, and a compressible fluid 159, such as nitrogen, that serves as the damping member. The partition wall 155 has a port 154 which is disposed offset from a twisting axis that is parallel to the swivel axis, and which communicates the upper compartment with the lower compartment.

The driven member 153 has an actuated portion 1531 which is disposed on one of the mounts 151, and which is rotatable relative to the mount 151 about the twisting axis, and a coupling portion 1532 which is tubular and which extends from the actuated portion 1531 in the upright direction and downwardly of the confronting wall 1511.

The twist actuating member includes a torsion spring 2 and a wire 32. The torsion spring 2 is sleeved around the actuated portion 1531 of the driven member 153, and has an end 21 (see FIG. 2) connected to the actuated portion 1531. The wire 32 has an end 321 connected to an opposite end 22 of the torsion spring 2 (see FIG. 3), and an opposite end 322 (see FIG. 2) connected to the brake lever 42 so as to be pulled by the brake lever 42 to twist the actuated portion 1531 of the driven member 153 about the twisting axis through the torsion spring 2, thereby angularly moving the respective coupling portion 1532 from a first position to a second position. Preferably, a cable shell 31 is disposed to shield the brake cable 33 and the wire, and has two ends 311,312 respectively connected to the mount 151 and the handlebar 17.

The regulating member includes a stem portion 157 which is coupled to the coupling portion 1532 of the driven member 153 so as to be moved angularly with the coupling portion 1532, and which is slidable along an inner surface of the coupling portion 1532, and a valve disc 156 which is connected to the stem portion 156 to rotate therewith. The valve disc 156 has a plurality of through holes 1561 which are of varying dimensions to control flow of different amounts of the compressible fluid 159 therethrough, and which are angularly displaced from one another about the twisting axis.

Due to the provision of the compressible fluid 159, shock energy that is generated by an abrupt movement of the upper ends 1523 of the leg members 152 relative to the confronting walls 1511 of the mounts 151, which is brought about by a sudden depression on the support frame 10 by the combined inertial momenta of the mass of a rider and the mass of the bicycle 1 when the brake actuating member 4 is actuated, or by a shock transmitted upwards through the front wheel axle 110 as a result of unevenness of a road surface being traversed by the bicycle 1, can be diminished progressively.

In operation, when the brake actuating member 4 is manipulated, the twist actuating member is simultaneously actuated to twist the actuated portion 1531 of the driven member 153 about the twisting axis so as to angularly move the coupling portion 1532 and the stem portion 157 of the regulating member from the first position to the second position such that a smaller one of the through holes 1561 in the valve disc 156 is brought to be registered with the port 154 in the partition wall 155, thereby reducing the extent of fluid communication established by the port 154 between the upper and lower compartments. Thus, the damping capacity of the compressible fluid is decreased, thereby counteracting the relative movement of the upper ends 1523 towards the confronting walls 1511 of the mounts 151 for enhancing the safety and comfort of the rider.

Figure 6:
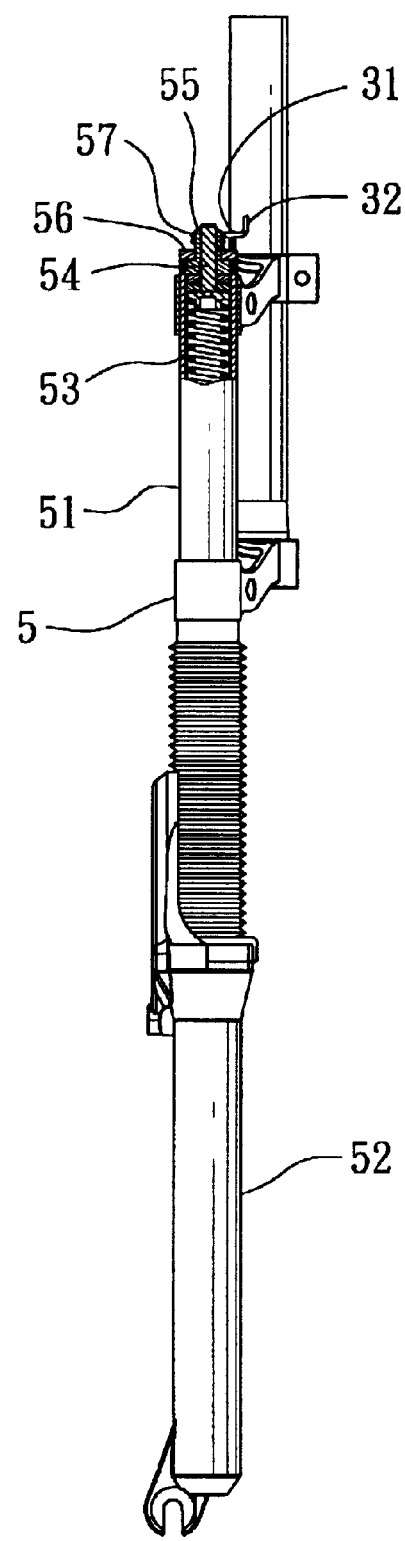
FIG. 6 is a fragmentary perspective view of a second preferred embodiment of the shock absorbing device according to this invention.
Figure 7:
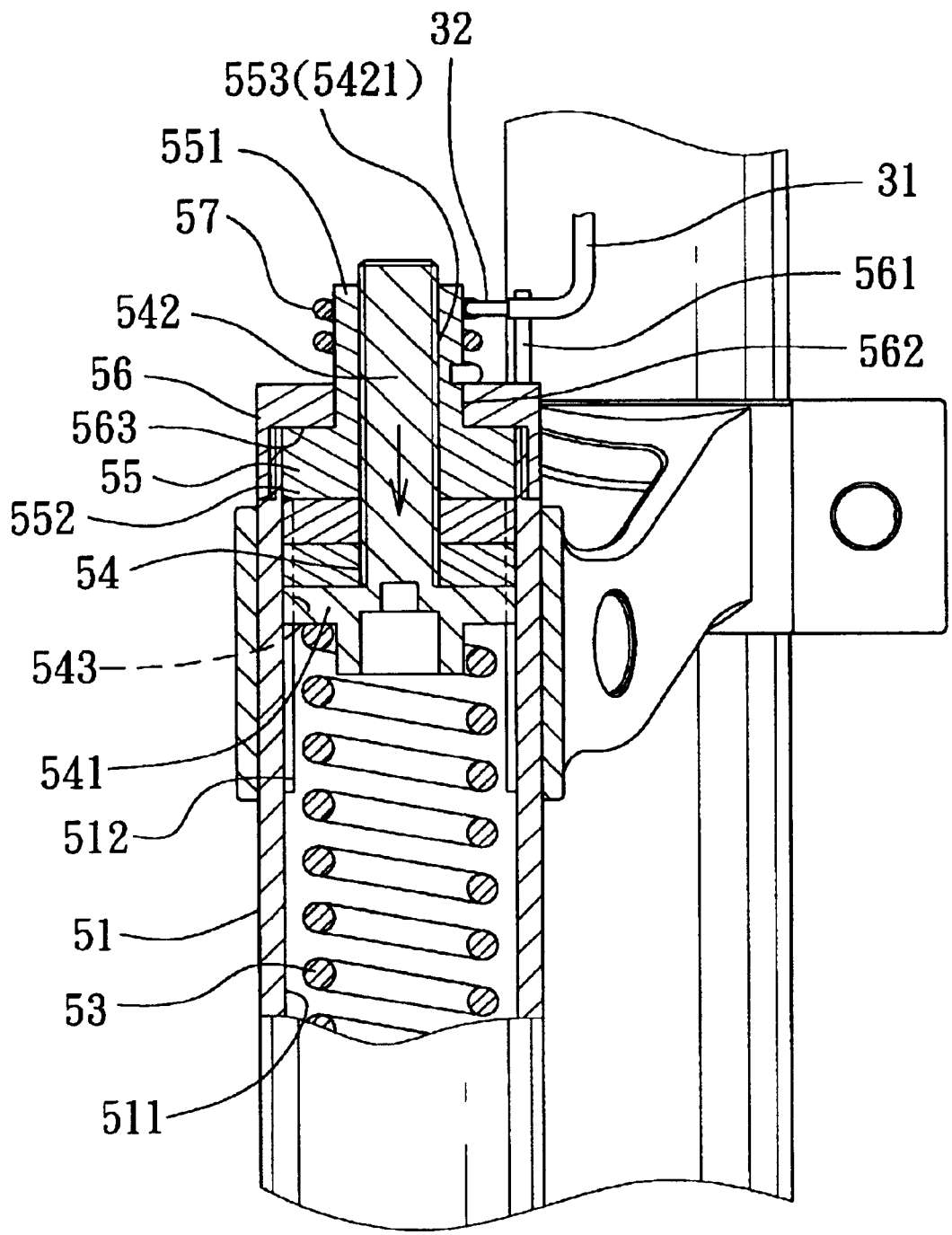
FIG. 7 is a fragmentary partly sectional view of the second preferred embodiment.

Referring to FIGS. 6 and 7, the second preferred embodiment of a shock absorbing device 5 according to this invention is similar to the first preferred embodiment in construction and operation. The shock absorbing device 5 of this embodiment includes a pair of mounts 51, a pair of leg members 52, a pair of damping members that are configured as compression springs 53, a driven member 55, a twist actuating member that includes a torsion spring 57 and a wire 32 which are the same as those in the first preferred embodiment, and a regulating member 54.

Each of the mounts 51 has a peripheral guiding wall 511 which extends downwardly of the regulating member and along the twisting axis so as to surround the coupling portion 552 of the driven member 55, and which has a plurality of guiding ribs 512 formed thereon. The coupling portion 552 has an inner tubular wall which defines a through bore extending along the twisting axis and through the actuating portion 551 and which has an internally threaded surface 553. A cap member 56 is disposed to engage the mount 51 threadedly, and is formed with a confronting wall 563 that confronts the driven member 55, and a hole 562 for passage of the actuating portion 551 therethrough. The cable shell 31 is fixed to a lug 561 of the cap member 56.

The regulating member includes a shank 542 which is received in the through bore, and which has an externally threaded surface 5421 to threadedly engage the internally threaded surface 553. The shank 542 extends downwardly and outwardly of the through bore, and terminates at a bottom end. A depression slider 541 extends from the bottom end of the shank 542 in radial directions, and has a plurality of sliding grooves 543 to slidably engage the guiding ribs 512 such that the depression slider 541 is in a spline engagement with the peripheral guiding wall 511.

The compression spring 53 serves as the damping member, and has upper and lower spring ends that respectively abut against the depression slider 541 and the upper end of the leg member 52.

As such, when the coupling portion 552 of the driven member 55 is turned from the first position to the second position by the twist actuating member in the manner as described in the first embodiment, the depressing slider 541 is forced to move downwardly along the twisting axis to compress the compression spring 53, thereby decreasing the damping capacity of the compression spring 53. Thus, the relative movement of the mounts 51 towards the leg members 52 can be counteracted during the braking action.

Figure 8:
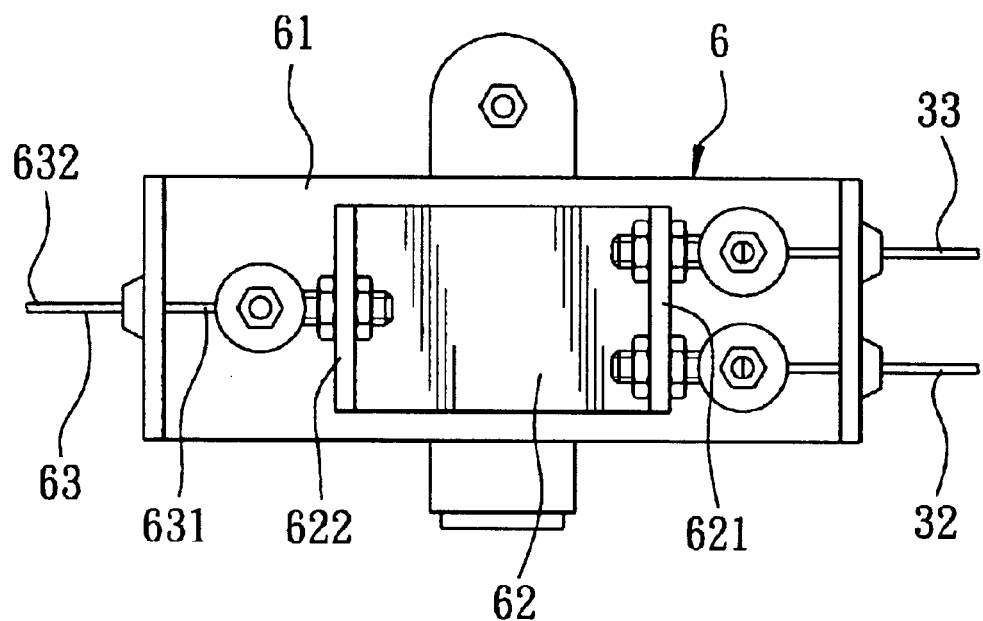
FIG. 8 is a schematic view of a synchronizing member of the second preferred embodiment.

Furthermore, referring to FIG. 8, a synchronizing member 6 is provided, and includes a casing 61 and a movable portion 62 which is received movably in the casing 61 and which has an end 621 engaging the brake cable 33 and the wire 32, and an opposite end 622 engaging an end 631 of an operating cable 63. The operating cable 63 has an opposite end 632 which is connected to the brake lever 42 so as to permit the brake cable 33 and the wire 32 to be pulled synchronously by the brake lever 42.

It is noted that the shock absorbing device 15,5 according to this invention is not limited to be mounted above the front wheel axle 110. Alternatively, the shock absorbing device 15,5 may also be mounted above a rear wheel axle of a bicycle.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A shock absorbing device adapted for use in a bicycle which includes
    a support frame defining a swivel axis in an upright direction,
    a handlebar disposed to turn the support frame about the swivel axis,
    a wheel axle that defines a rotating axis transverse to the upright direction, and that is provided with a wheel for rotating about the rotating axis, and
    a brake actuating member mounted to the handlebar and being operable to slow down and stop the rotation of the wheel,
    said shock absorbing device comprising:
    a mount adapted to be mounted to the support frame, and having a confronting wall which faces downwards in the upright direction and which has a periphery;
    a leg member including a lower end which is adapted to be anchored to the wheel axle, and an intermediate segment which extends from said lower end in the upright direction and which terminates at an upper end that is spaced apart from said confronting wall and that is movable relative to said confronting wall in the upright direction;
    a driven member having an actuated portion which is disposed on said mount, and which is rotatable relative to said mount about a twisting axis that is parallel to the swivel axis, and a coupling portion which extends from said actuated portion in the upright direction and downwardly of said confronting wall;
    a twist actuating member disposed in synchronized operation with the brake actuating member to twist said actuated portion of said driven member to rotate about the twisting axis so as to angularly move said coupling portion from a first position to a second position;
    a damping member provided with a damping capacity, and disposed between said upper end of said leg member and said confronting wall so as to diminish progressively the shock energy generated by an abrupt movement of said upper end relative to said confronting wall, which is brought about by a sudden depression on the support frame by the combined inertial momenta of the mass of a rider and the mass of the bicycle when the brake actuating member is actuated, or by a shock transmitted upwards through the wheel axle as a result of unevenness of a road surface being traversed by the bicycle; and
    a regulating member configured to vary the damping capacity of said damping member in response to the angular movement of said coupling portion from the first position to the second position.

2. The shock absorbing device according to claim 1, wherein said mount further includes a surrounding wall which extends in the upright direction from said periphery of said confronting wall towards said lower end and which terminates at a lower surrounding edge, a bottom wall which extends in radial directions from said lower surrounding edge so as to be spaced apart from said confronting wall and which cooperates with said surrounding wall to confine a cylindrical chamber,
    wherein said intermediate segment of said leg member extends through said bottom wall into said cylindrical chamber, said upper end of said leg member extending radially to form a partition wall which is configured to be in sliding contact with said surrounding wall so as to divide said cylindrical chamber into upper and lower compartments that are respectively proximate to said confronting wall and said bottom wall, said lower and upper compartments being respectively filled with a non-compressible fluid and a compressible fluid that serves as said damping member, said partition wall having a port which is offset from the twisting axis and which communicates said upper compartment with said lower compartment,
    said regulating member including a stem portion which is coupled to said coupling portion so as to be moved angularly with said coupling portion, and a valve disc which is connected to said stem portion to rotate therewith, and which is configured such that when said coupling portion is moved from the first position to the second position, said valve disc is capable of varying the extent of fluid communication established by said port between said upper and lower compartments, thereby varying the damping capacity of said compressible fluid.

3. The shock absorbing device according to claim 2, wherein said valve disc has a plurality of through holes which are of varying dimensions, and which are angularly displaced from each other about the twisting axis such that when said coupling portion is moved from the first position to the second position, a smaller one of said through holes is brought to be registered with said port so as to reduce the extent of fluid communication between said upper and lower compartments, thereby decreasing the damping capacity of said compressible fluid.

4. The shock absorbing device according to claim 1, wherein said twist actuating member includes a wire which is adapted to be pulled by the brake actuating member, and a torsion spring which is sleeved around said actuated portion, and which has two opposite ends that are respectively connected to said actuated portion and said wire so as to turn said actuating portion when said wire is pulled by the brake actuating member.

5. The shock absorbing device according to claim 1, wherein said mount further includes a peripheral guiding wall extending downwardly of said regulating member and along the twisting axis so as to surround said coupling portion,
    wherein said coupling portion has an inner tubular wall which defines a through bore extending along the twisting axis and through said actuated portion, and which has an internally threaded surface,
    said regulating member including
        a shank which is received in said through bore, and which has an externally threaded surface to threadedly engage said internally threaded surface, said shank extending downwardly and outwardly of said through bore and terminating at a bottom end, and
        a depressing slider which extends from said bottom end of said shank in radial directions, and which is configured such that said depressing slider is in a spline engagement with said peripheral guiding wall, said damping member being a compression spring which have upper and lower spring ends that abut against said depressing slider and said upper end of said leg member such that when said coupling portion is moved from the first position to the second position, said depressing slider is forced to move downwards along the twisting axis to compress said compression spring so as to vary the damping capacity of said compression spring.

6. A hand-operated device for diminishing braking initiated shock, and adapted for use in a bicycle which includes

- a support frame defining a swivel axis in an upright direction,
- a handlebar disposed to turn the support frame about the swivel axis, and
- a wheel axle that defines a rotating axis transverse to the upright direction, and that is provided with a wheel for rotating about the rotating axis, said hand-operated device comprising:

- a brake actuating member adapted to be mounted to the handlebar and being operable to slow down and stop the rotation of the wheel; and
- a shock absorbing device including
- a mount adapted to be mounted relative to the support frame, and having a confronting wall which faces downwards in the upright direction,
- a leg member including a lower end which is adapted to be anchored to the wheel axle, and an intermediate segment which extends from said lower end in the upright direction and which terminates at an upper end that is spaced apart from and that is movable relative to said confronting wall in the upright direction,
- a driven member having an actuated portion which is disposed on said mount, and which is rotatable relative to said mount about a twisting axis that is parallel to the swivel axis, and a coupling portion which extends from said actuated portion in the upright direction and downwardly of said confronting wall,
- a twist actuating member disposed in synchronized operation with said brake actuating member to twist said actuated portion of said driven member to rotate about the twisting axis so as to angularly move said coupling portion from a first position to a second position,
- a damping member provided with a damping capacity, and disposed between said upper end of said leg member and said confronting wall so as to diminish progressively the shock energy generated by an abrupt movement of said upper end relative to said confronting wall, which is brought about by a sudden depression on the support frame by the combined inertial momenta of the mass of a rider and the mass of the bicycle when said brake actuating member is actuated, or by a shock transmitted upwards through the wheel axle as a result of unevenness of a road surface being traversed by the bicycle, and
- a regulating member configured to vary the damping capacity of said damping member in response to the angular movement of said coupling portion from the first position to the second position.

7. The hand-operated device according to claim 6, wherein said brake actuating member includes a brake lever which is adapted to be mounted pivotally on the handlebar, and a brake cable which is pulled by said brake lever to slow down and stop the rotation of the wheel.

8. The hand-operated device according to claim 7, wherein said twist actuating member includes a wire which is pulled by said brake lever, and a torsion spring which is sleeved around said actuated portion, and which has two opposite ends that are respectively connected to said actuated portion and said wire so as to turn said actuating portion when said wire is pulled by said brake lever.

9. The hand-operated device according to claim 8, further comprising a synchronizing member that has an end connected to said brake cable and said wire, and an opposite end connected to said brake lever so as to permit said brake cable and said wire to be pulled synchronously by said brake lever.

* * * * *